(12) United States Patent
Rohrer et al.

(10) Patent No.: US 7,671,504 B2
(45) Date of Patent: Mar. 2, 2010

(54) ELECTRIC MOTOR WITH MULTILAYERED RHOMBIC SINGLE COILS MADE OF WIRE

(75) Inventors: Richard Rohrer, Giswil (CH); Jens Schulze, Winterthur (CH); Remy Hofer, Luzern (CH); Albin Von Moos-Woehrl, Sachseln (CH); Martin Gaul, Giswil (CH); Peter Mitterbaeck, Hergiswil (CH); Juergen Mayer, Sachseln (CH)

(73) Assignee: Maxon Motor AG, Sachseln (CH)

( * ) Notice: Subject to any disclaimer, the term of this patent is extended or adjusted under 35 U.S.C. 154(b) by 251 days.

(21) Appl. No.: 11/584,485

(22) Filed: Oct. 23, 2006

(65) Prior Publication Data
US 2007/0103025 A1 May 10, 2007

(30) Foreign Application Priority Data
Oct. 25, 2005 (KR) .................. 10 2005 051 059

(51) Int. Cl.
*H02K 17/00* (2006.01)
(52) U.S. Cl. .................. 310/208; 310/179; 310/203
(58) Field of Classification Search ......... 310/179–180, 310/203, 208, 254
See application file for complete search history.

(56) References Cited

U.S. PATENT DOCUMENTS

| | | | |
|---|---|---|---|
| 2,361,842 A | | 10/1944 | Heintz et al. |
| 3,775,628 A | * | 11/1973 | Andersson et al. ......... 310/208 |
| 4,292,558 A | | 9/1981 | Flick et al. |
| 4,376,904 A | * | 3/1983 | Horrigan .................. 310/208 |
| 5,270,602 A | | 12/1993 | Takehara |
| 5,304,884 A | * | 4/1994 | Kitajima et al. ............ 310/198 |
| 5,313,131 A | | 5/1994 | Hibino et al. |
| 5,744,896 A | * | 4/1998 | Kessinger et al. .......... 310/268 |
| 5,793,133 A | * | 8/1998 | Shiraki et al. ............. 310/81 |
| 6,355,993 B1 | | 3/2002 | Hazelton et al. |
| 6,452,292 B1 | | 9/2002 | Binnard |
| 6,791,224 B1 | * | 9/2004 | Ozawa et al. .............. 310/179 |
| 6,856,063 B1 | | 2/2005 | Kelecy et al. |
| RE38,939 E | * | 1/2006 | Kessinger et al. .......... 310/268 |
| 2005/0168095 A1 | * | 8/2005 | Tanimoto et al. .......... 310/208 |

FOREIGN PATENT DOCUMENTS

| | | |
|---|---|---|
| DE | 1 270 668 | 6/1968 |
| DE | 1 538 843 | 2/1970 |

(Continued)

OTHER PUBLICATIONS

International Search Report dated May 4, 2006 (with English translation of category of cited documents).

*Primary Examiner*—Thanh Lam
(74) *Attorney, Agent, or Firm*—Buchanan Ingersoll & Rooney PC (57) ABSTRACT

An electric motor is disclosed with an air-cored winding which is composed of a plurality of single coils made of wire, wherein the single coils overlap each other in an imbricated manner and the single coils are preformed to form an offset at least in the region of two opposite corners, so that half of the legs are located in a first plane and half of the legs are located in a second plane. A more inexpensive and more robust assembly of air-cored windings for electric motors can thereby be achieved.

17 Claims, 9 Drawing Sheets

FOREIGN PATENT DOCUMENTS

| | | |
|---|---|---|
| DE | 1 801 263 | 4/1970 |
| DE | 2 341 713 | 3/1974 |
| DE | 3 119 325 A1 | 12/1982 |
| DE | 44 28 040 C1 | 7/1995 |
| EP | 0 056 606 A1 | 7/1982 |
| GB | 2 092 833 A | 8/1982 |
| JP | 55-79640 | 6/1980 |
| JP | 10-042527 | 2/1998 |
| JP | 2001-037130 | 2/2001 |
| JP | 2002-112526 | 4/2002 |
| JP | 2004-064825 | 2/2004 |
| KR | 2000-0016004 | 3/2000 |
| RU | 2120174 | 10/1998 |
| SU | 129 0462 A1 | 11/1979 |
| SU | 125 1237 A1 | 8/1986 |

\* cited by examiner

ELECTRIC MOTOR WITH MULTILAYERED RHOMBIC SINGLE COILS MADE OF WIRE

CROSS-REFERENCE TO RELATED PATENT APPLICATION

This application claims the benefit of German Application No. 10 2005 051 059.0, filed on Oct. 25, 2005 in the German Intellectual Property Office, the disclosure of which is incorporated herein in its entirety by reference.

BACKGROUND

An electric motor is disclosed having an air-cored winding composed of a plurality of single coils made of wire, wherein the single coils overlap each other in an imbricated manner.

An air-cored winding is disclosed usable both in the rotors of DC motors and the stators for EC motors.

Like most of the electric motors, also the motors described herein may basically be constructed as rotating motors or linear motors. In this case, the single windings are arranged side by side in a flat or curved imbricated manner; instead of closing to form a symmetric hollow cylinder they have front and rear ends in the direction of movement. A linear motor having a straight direction of movement basically results from a cylindrical projection of a rotative motor. The radial coordinate is projected on the Cartesian coordinate perpendicular to the direction of movement, the tangential coordinate or angular coordinate is projected on the Cartesian coordinate in the direction of movement, and the axial coordinate is projected on the Cartesian coordinate perpendicular to the two ones defined above. The terms of the cylindrical coordinates will hereinafter be used analogously and simultaneously to designate the corresponding Cartesian coordinates in this projection.

The single coils according to the prior art can be fabricated from a wire having, in addition to an insulation, a layer which allows for a pasting or caking. By this, the fabrication process can also take place in several individual steps without having to ensure the coherence of the single coils inbetween mechanically.

Cylindrical windings for electric machines are known from the prior art, e.g. from DE 1538843 A1, where the coils are fabricated from a wire and drawn to have a rhombic shape.

A method for fabricating such cylindrical windings for electric machines is known from DE 1801263 A1.

Such windings are used both in the rotor of small permanently excited direct current motors and in the stator of electronically commutated electric motors.

The mechanically commutated direct current motors having such windings are also referred to as motors having air-cored rotors, electric motors with bell-shaped rotors or drag-cup motors. The corresponding electronically commutated motors are called motors having an air-cored winding or slotless/keyless motors.

These motors are appreciated and applied in many places owing to their high efficiency, their freedom of detent torque and their linear control characteristics (open loop and/or closed loop).

Also linear motors having a corresponding structure are known from the prior art. Also electric motors having windings made up of single coil cylinders are known from the prior art.

SUMMARY

Electric motors are disclosed which can have an improved electric and mechanical symmetry and a higher output. Moreover, a higher degree of automation can be achieved during the production of such electric motors.

One generic solution to the problem resides in the single coils being preformed to form an offset at least in the region of two opposite corners, so that half of the legs are located in a first plane and half of the legs are located in a second plane.

In a special embodiment this can be understood such that each leg of the single coil is located in a radially different plane than the respective other leg at the same axial height so as to allow the single coils to be placed above each other in an imbricated manner. Such planes are optionally curved and have a cylindrical shape. This change in plane will hereinafter be referred to as offset.

For the realization of the imbricated arrangement an offset is required at least in the region of two opposite corners of the single coil in the region of the axial ends of the winding. This region of the axial ends of the winding will hereinafter be referred to as neutral zone.

By the imbricated arrangement an optimum exploitation of the winding space can be achieved. This advantageously results in an optimized power density. Another advantage is that the single coils can align each other mutually so that an increased symmetry can be achieved. With direct current motors and also electrically commutated motors an improved electric symmetry can be obtained, and thus a smoother and lower-loss motor operation follows. With direct current motors another advantage effectuated thereby is a less unbalanced, uniform rotation of the rotor. Moreover, the design offers a simple possibility to automate the fabrication of the winding.

In an exemplary embodiment the single coil is, in the unwound form, arranged spirally about an axis which, in the wound up winding, extends in a radial direction, so that the wires in the neutral zone extend substantially tangentially. This embodiment will hereinafter be referred to as concentric embodiment. As the single coils in the finished winding do not overlap in this region, the offset in this region may be formed in an optional curve shape.

This embodiment allows in a particularly advantageous manner the parallel winding of several wires such that they are located parallel to the winding axis in the unwound coil and perpendicularly side by side to the axis of rotation or, respectively, to the plane of motion in the wound up form. In the finished winding, the wires wound in parallel are electrically connected in parallel.

Another advantageous embodiment resides in twisting or cabling a plurality of insulated single wires to form a strand prior to the winding process, wherein the single wires of the strand are electrically connected in parallel in the finished winding. Of course, also only one wire per coil may be used.

If the single coil is provided with additional wire material as feed to allow the offset, this is particularly advantageous because additional wire material is needed for the production of the offset, and additional wire material in this region prevents the wire from overstretching.

In one embodiment such a feed can be realized particularly advantageously if the feed is formed as a hairpin-type or loop-shaped bulge of the inner contour of the coil and both the inside and the outside of the single coil have a predefined shape, since this is how a neat form closure over the entire diagonal line is obtained and the advantage of an optimum use of space as well as of a self-alignment is achieved.

Another advantageous embodiment of the single coil is asymmetric in the sense that at least the single coil in the unwound flat state has a substantially quadrangular shape with unequally long legs and/or a kite-quadrangular shape (Deltoid). By a kite-shaped design of the single coil in the unwound flat state the winding may be assembled such that all single coils are adjacent each other in a flush manner. While, if the single coils are designed symmetrically, the legs located radially outside are provided with gaps if the inner legs are located close to each other, the asymmetry of the legs can be designed such that both the outer legs and the inner legs are located close to each other in the wound up winding, so that a neat form closure over the entire diagonal line is obtained in both layers and the advantage of both the optimum use of space and the self-alignment is improved in an advantageous manner. For very thin-walled cylinders the radii of the inner and the outer layer are hardly different, and the ideal shape approaches a symmetrical one. For non-curved linear motors the ideal shape is symmetrical.

In another exemplary embodiment the single coils are provided with individual windings between ideally adjacent diagonal sections in an ideally axial central position characterizing a less inclined section extending ideally parallel to the axis, said section ideally forming a hexagon. Thus, in motors with elongated windings, the advantage of a higher power density can be achieved. The central sections may be straight or also slightly beveled. A slightly beveled design has an advantageous effect on the stability of the winding as compared to the entirely straight embodiment, since the coils are thereby staggered or entangled also in this part.

In another exemplary embodiment the single coils are wound, in the unwound form, about an axis which, in the wound up winding, extends in a tangential direction, so that the wires in the neutral zone extend substantially radially, thereby producing an offset.

The specific quadrangular or hexagonal shape is achieved by the subsequent lengthwise tensioning.

The winding is fabricated in single coils, which creates the advantageous embodiment to obtain a more precise wire position and design. This embodiment, like the embodiment described above, therefore has a positive effect on the symmetry, the use of space and the assembling capability in a like manner. The winding can be embodied with single wires or wires cabled/twisted to form strands, but can also be made with single wires routed in parallel.

As an alternative to the lengthwise tensioning a single coil may be formed in yet another embodiment such that, in addition to the radially extending offset on both ends of the winding, it comprises two times a further offset at other inversion points. Inversion points refer to regions in which the wires change their direction.

If the single coil comprises a front-end portion and an end portion of the single-layered or multilayered wire forming the single coil, with the front-end and end portions routed outwardly in the region of one of the corners of the single coil, a power supply of the winding in the finished state is possible particularly easily with conventional means achieved.

To achieve a favorable conductive connection between the single coils it is advantageous in one modification, especially for direct current motors, if one front-end portion of a first single coil is connected with an end portion of a second single coil to form a connecting lead of the rotor. A corresponding embodiment may also be used for electronically commutated motors.

A method is also disclosed of producing an electric motor comprising a winding in accordance with one of the device claims. Here, too, a higher degree of automation can be acheived in the production and to allow a better quality of the winding.

A particularly good contacting with only little expenditure can be achieved if a front-end portion of the wire layer of a first single coil is cabled/twisted with an end portion of an adjacent single coil, wherein the front-end portion of the wire of a first single coil is passed along on the outer side of a second single coil up to the end portion of the wire of the second single coil.

It is likewise an advantage if the wires each change planes at the lower and upper end respectively by extending perpendicularly to the plane of projection. This allows a fast uncomplicated change of the wires from one plane to the other.

If the legs located outside in the wound up coil are inclined more strongly than the legs located inside in the wound up coil, yet another advantageous embodiment can be realized.

BRIEF DESCRIPTION OF THE DRAWINGS

Examples of embodiments will be explained in more detail by means of a drawing below. In the drawings.

DETAILED DESCRIPTION

Figure 1:
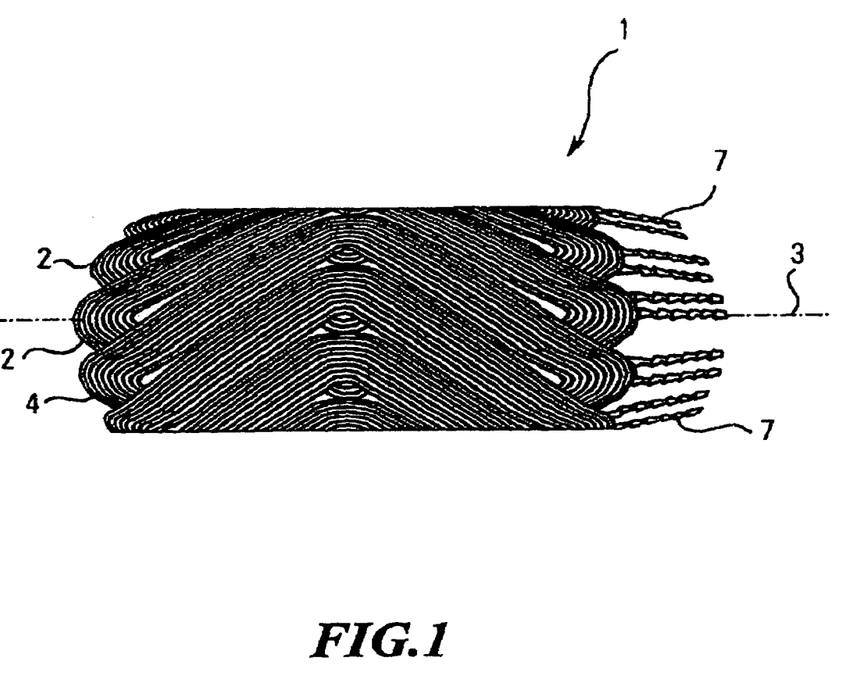
FIG. 1 shows a lateral view of an exemplary winding with single coils in a concentric form.

FIG. 1 shows a lateral view of the complete winding 1 of the electric motor according to an exemplary embodiment. The winding 1 comprises a hollow cylindrical body. The hollow cylindrical body of the winding is composed of a plurality of single coils 2. The single coils are thereby interleaved above each other in an imbricated manner. In FIG. 1 one half of a single coil 2 can be seen, while the other half of the respective single coil 2 is covered by an adjacent single coil 2. The other half of the single coil 2 is therefore located on the outside of the winding 1, and the other half on the inside of the winding 1. The winding 1 has a central axis of symmetry 3, which is simultaneously also the axis of rotation of the rotor and a longitudinal axis of the same. The symmetry of the inner structure of the winding is ideally a rotational symmetry. The one half of a single coil 2 has a smaller distance to this axis of symmetry than the other half of the single coil 2. Thus, the single coil has two different curvature radii. Three wires 4 located radially above the other form a single coil 2 in concentric rhombic side-by-side arrangements. The three wires form a front-end portion 5 and an end portion 6. The single wires 4 of an end portion 6 of a first single coil 2 are cabled with the wires 4 of a front-end portion 5 of a second single coil 2 and form a connecting lead 7 of the winding. The connecting leads 7 are well recognizable in FIG. 1 as compared to the front-end portions 5 and end portions 6 of the wire 4. The front-end portions 5 and the end portions 6 of the wires can better be recognized in FIG. 2.

Figure 9:
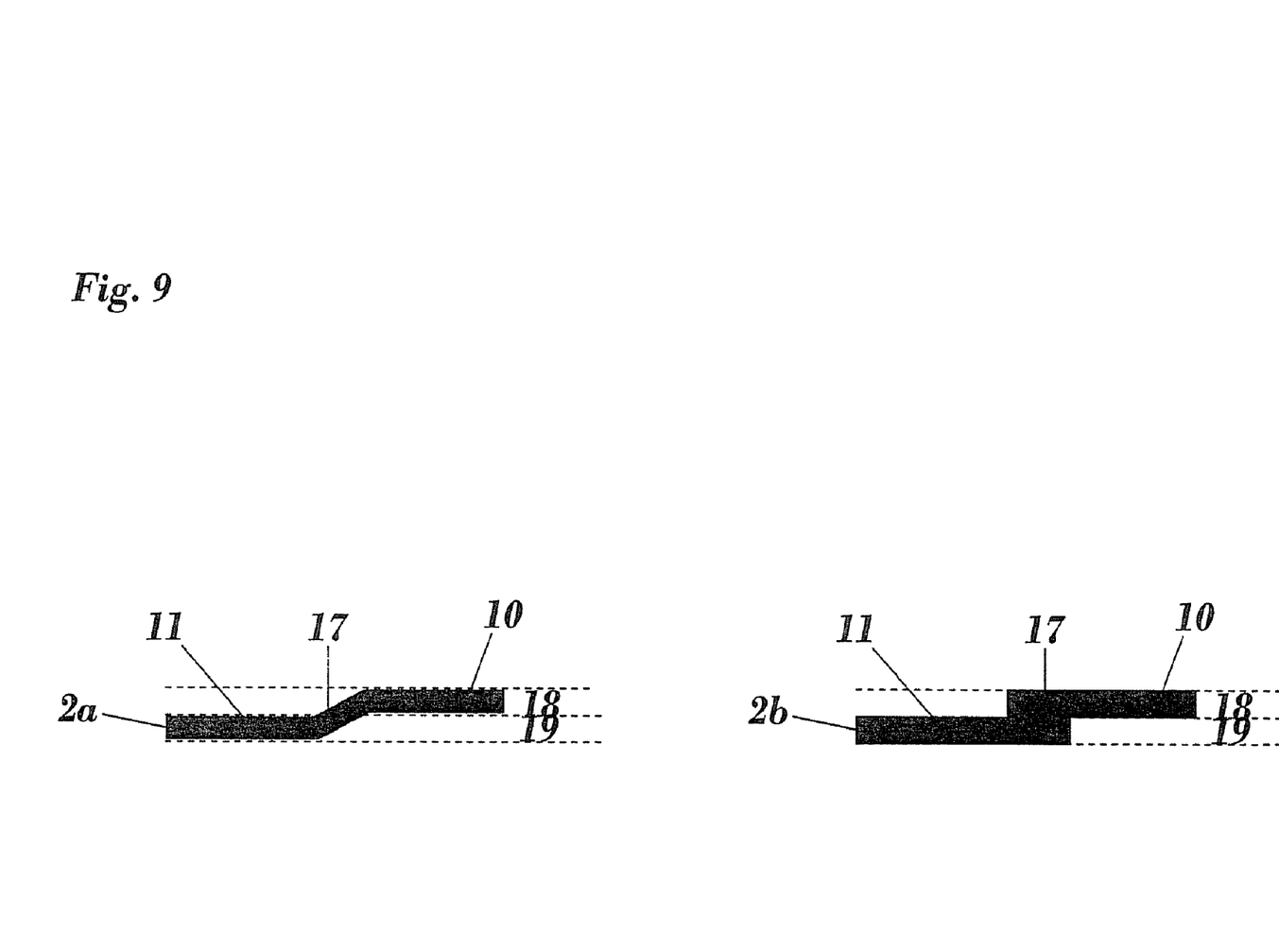
FIG. 9 shows in greater detail the FIG. 1 legs in first and second planes.

It can also be recognized well that the single coils 2 overlap each other in an imbricated manner and that the one half of the legs are located in an inner cylinder 16 while the other half of the legs are located in an outer cylinder 15 by forming an offset. As shown in FIG. 9 half of the legs are located in a first plane 18 and the other half of the legs, by forming an offset 17, are located in a plane 19 parallel thereto. The shape of the single coils 2 is such that the single coils 2 are formed on at least one section of at least one leg 9, 10, 11, 12 such that the outer edge of the one winding 1 touches the inner edge of the adjacent winding 1 such that the tangential freedom of movement of the single coil 2 is limited by a form closure. The beveled portion of the legs of the outer layer 9 and 10 is greater than that of the inner layer 11 and 12.

Figure 2:
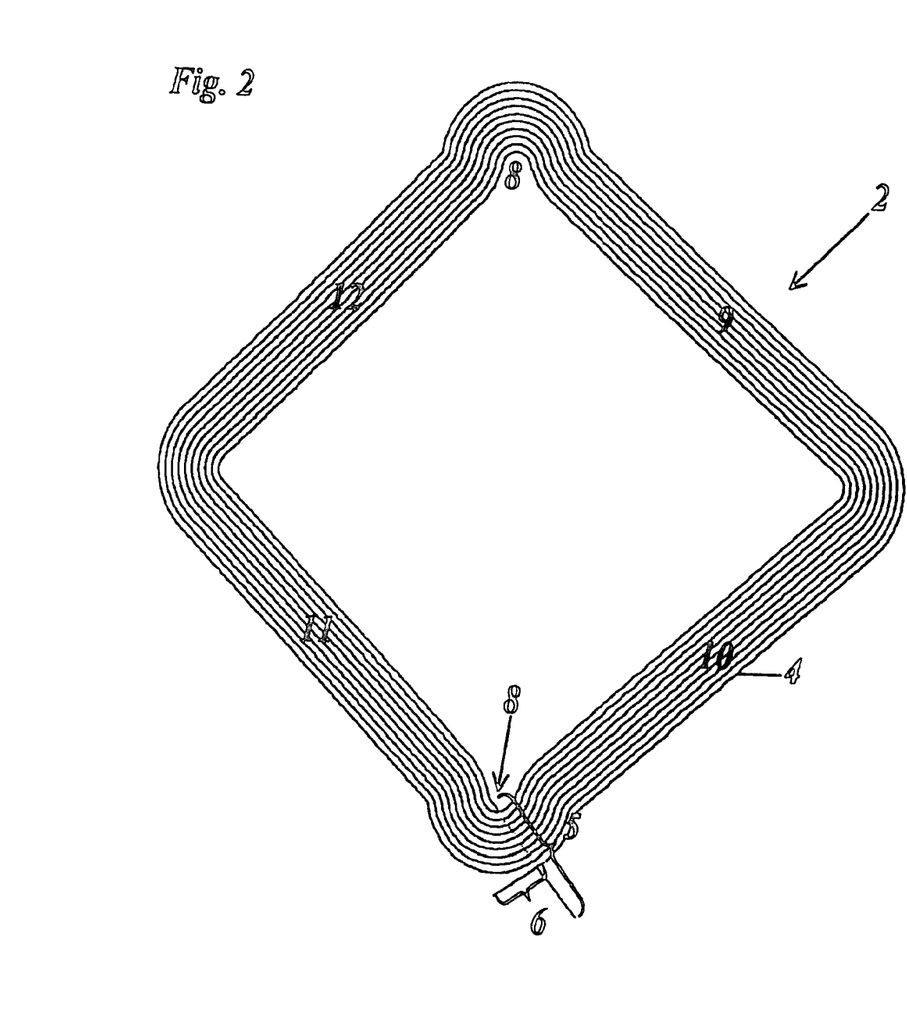
FIG. 2 shows a schematic detailed view of an embodiment of the single coil in a concentric form, but in the unwound flat state.

FIG. 2 shows a single coil 2. In this embodiment of the single coil 2 a feed 8 is provided on the side opposing the front-end and end portions 5 and 6. This feed 8 is formed as a hairpin-type bulge.

In accordance with an exemplary embodiment, the feed can be inserted in each place where a radial offset occurs.

As shown in FIG. 2 also the opposite corner of the single coil 2, i.e. the portion from which the front-end-portion 5 and the end portion 6 emerge, is provided with a feed 8. The feed 8 is necessary to produce an offset described in more detail in FIG. 6. The two right-handed legs 9, 10 of the single coil 2 of FIG. 2 are then no longer located in the same plane as the two left-handed legs 11, 12 of the single coil 2. The two right-handed legs are located in a plane higher than the two left-handed legs. However, this is also possible the other way around.

The legs 9 and 10 located outside in the wound up coil are inclined more strongly than the legs 11 and 12 located inside in the wound up coil, thereby producing the shape of a kite quadrangle. By this, the single segments 2 may be adjacent both to the outer plane and the inner plane in a form-closed manner and the space can be filled optimally.

Like in all embodiments, in this case, too, the form-closure and the maximum filling of the outer plane may be waived. In FIG. 2 the wire 4 is schematically represented by a spirally wound line, regardless of the fact that several windings may be arranged successively perpendicular to the plane of projection before a new layer is set up. It is likewise possible to fabricate single coils from two or more wires, which are connected in parallel in the finished winding.

Figure 3:
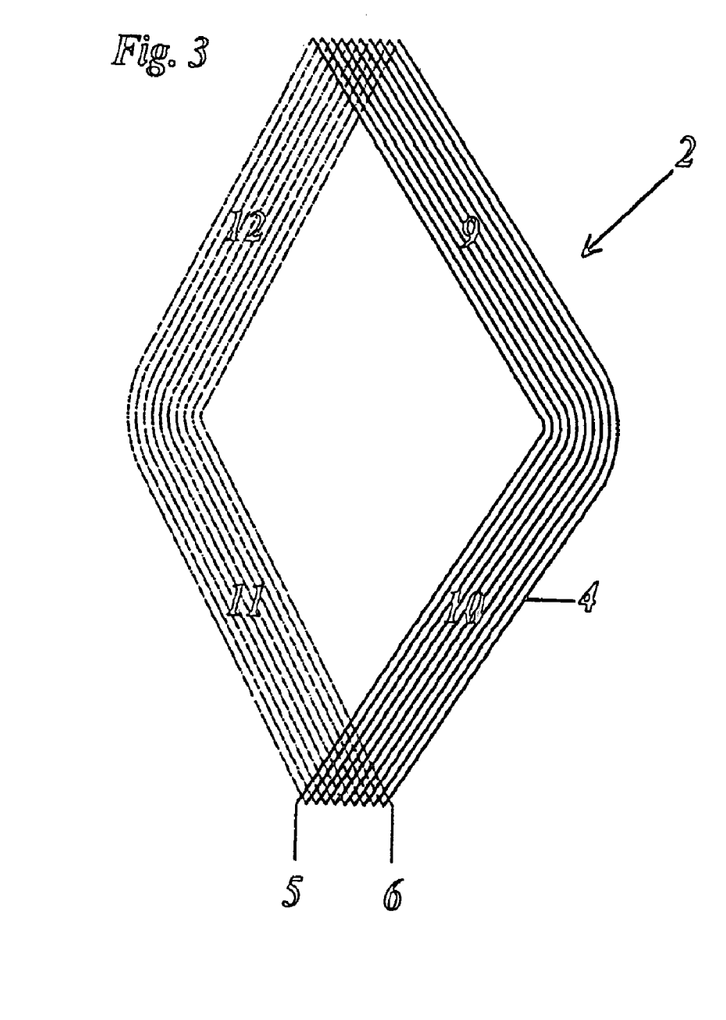
FIG. 3 shows a schematic detailed view of an embodiment of a single coil in a distributed form in the unwound flat state.

FIG. 3 shows a detailed view of an embodiment of a single coil 2 in a distributed form in an unwound flat state. The wire 4 is, again, shown schematically by a line. The wires each change at the lower and at the upper end of the plane by extending perpendicular to the plane of projection. The wires, which would be located in the outer plane in the finished winding, are shown in bold face. In the embodiment as illustrated these are the legs 9, 10 on the right side. The mirror-inverted arrangement is equivalent, however. In FIG. 3 it can be recognized particularly clearly that the legs 9, 10 located outside in the wound up coil are inclined more strongly than legs 11, 12 located inside in the wound up coil. By this, the single segments 2 may be adjacent both on the outer plane and the inner plane in a form-closed manner and the space can be filled optimally. Like in all embodiments, in this case, too, the form-closure and the maximum filling of the outer plane may be waived. The sense of winding the coil is not predetermined by its final shape; the front-end 5 of the coil or the end 6 of the coil may be arranged at the top.

Figure 4:
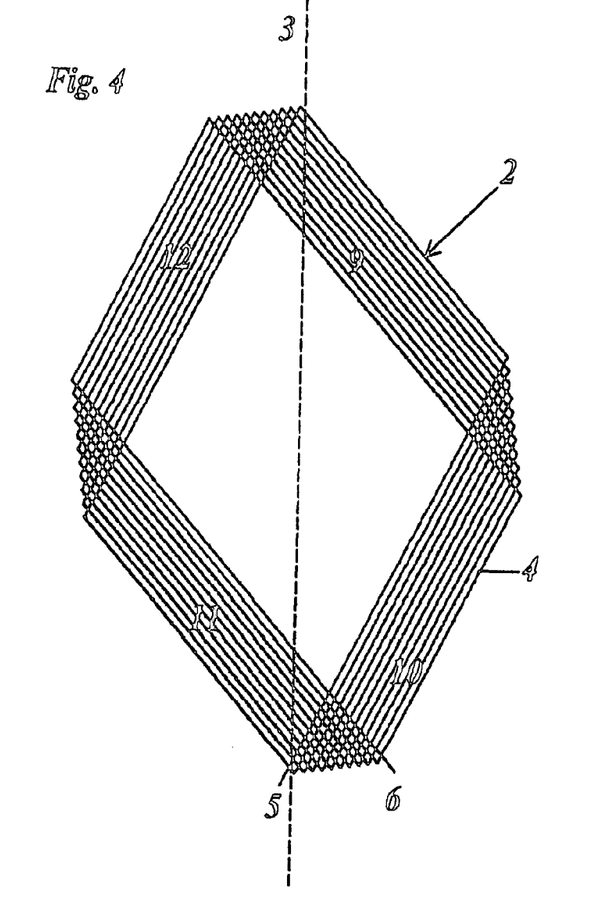
FIG. 4 shows a schematic detailed view of another embodiment of a single coil in a distributed form in the unwound flat state.

FIG. 4 shows a detailed view of a single coil according to another embodiment in an unwound flat state. It has a distributed form where the plane changes not only at the axial ends, but at each transition from one leg to the next. In FIG. 4 legs 9 and 11 are provided for the outer plane, legs 10 and 12 are provided for the inner coil plane. Owing to the beveled position with respect to the axis of symmetry 3 a form-closed and dense filling of the outer and inner layer may be achieved also in this embodiment. Like in other embodiments, in this case, too, the form-closure and the maximum filling of the outer plane may be waived.

Figure 5:
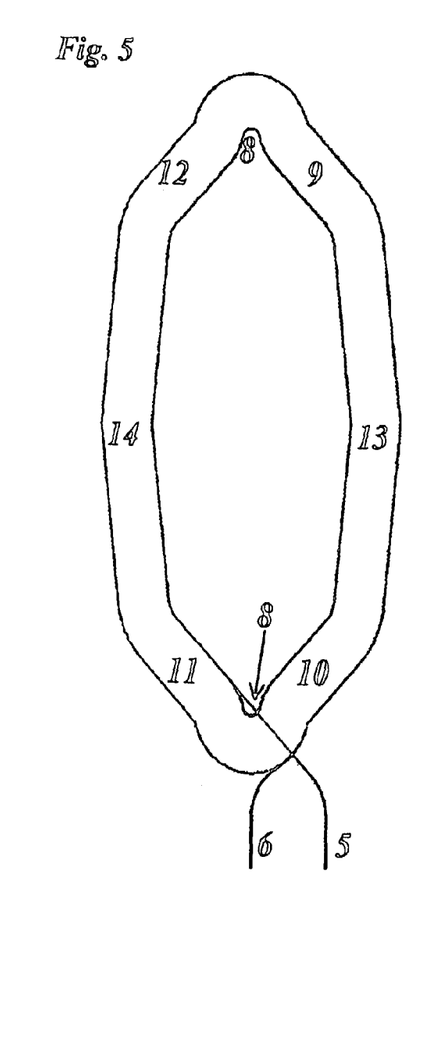
FIG. 5 shows two schematic representations of two further embodiments of the single coil in an unwound flat state, once with less beveled and once with straight sections.

FIG. 5 shows the contour of the single coils of two further embodiments in the unwound flat state. Shown are the front-end portion 5 and the end portion 6, while wires were omitted in the representation. A section 13 beveled to a smaller extent is located between leg 9 and 10, and likewise section 14 between leg 11 and 12. Sections 13 and 14 may be designed slightly beveled, as shown in the left-handed representation, or straight, as shown in the right-handed representation. A slightly beveled design has an advantageous effect on the stability of the winding as compared to the entirely straight embodiment, as the coils are thus staggered/entangled in this part, too. The contour shows the concentric embodiment including the typical feed 8. In a like manner the design with intermediate sections 13 and 14 inclined to a smaller extent can, however, be applied also to a distributed winding form, as shown in FIG. 3 without these intermediate sections.

Figure 6:
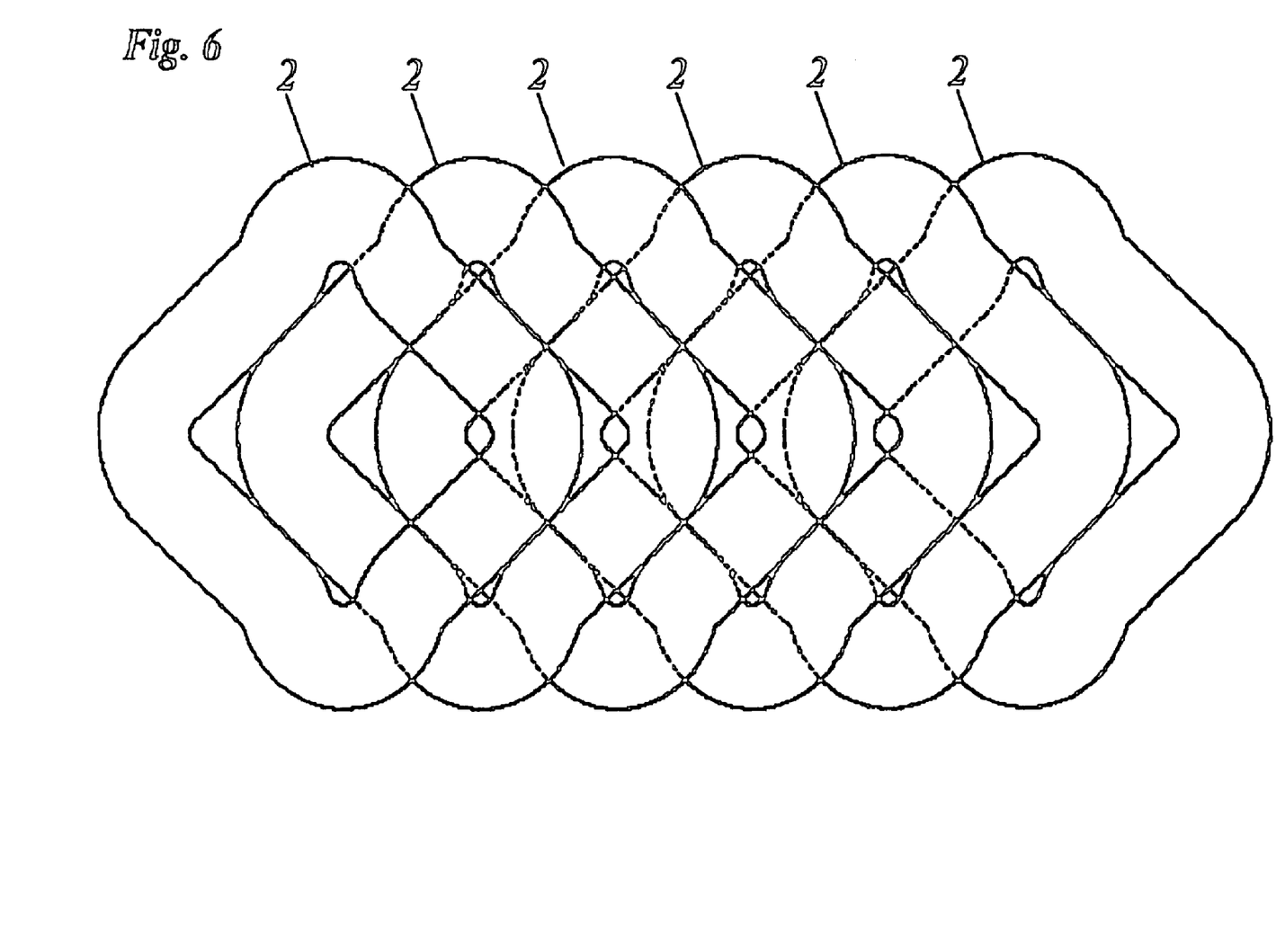
FIG. 6 shows a schematic representation of the imbricated arrangement of layers of several single coils.

FIG. 6 shows a schematic representation of an imbricated layer arrangement of six concentric single coils 2. The drawing as shown corresponds to a configuration for linear motors. It may also be regarded as a cylindrical winding in an unwound flat state. The hidden parts in this view are each drawn in a broken manner. The wires and the winding ends are not illustrated in this figure.

The single coils 2 are here each placed side by side in a form-closed manner. Each winding packet must be placed above the next winding packet on the one side (here on the right side) while it must be placed underneath the next winding packet on the opposite side (here on the left side).

In addition, these winding packets must be packed as densely as possible. This requires a vertical offset in each partial winding, namely twice, at the top and bottom, allowing one half to protrude and one half to remain offset backwardly. The vertical offset requires a certain wire length which should not act at the expenditure of the regularity of the winding.

The wire routing in the part being "active" for the motor, i.e. flown through by electric current, of the winding remains regular and parallel so that adjacent winding packets may be packed closely to each other. The feed in the neutral zone provides for the wire length necessary for the vertical offset. This feed in the neutral zone enables the vertical offset of the two partial winding halves without being damaged. By the bending into the vertical offset the respective partial winding half is, in this case, contracted by a reproducible extent. This extent has to be considered in the winding process, so that the resulting partial winding maintains the optimum geometry after the bending into the vertical offset.

Figure 7:
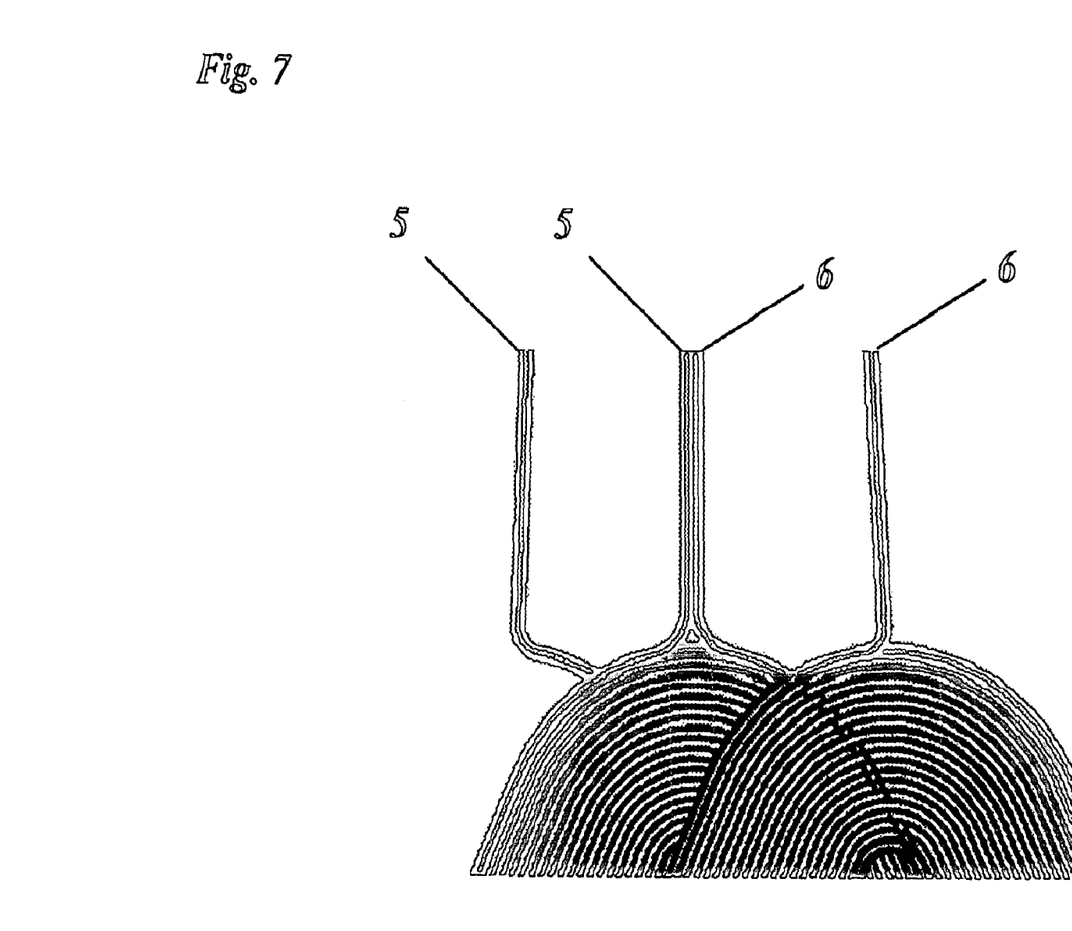
FIG. 7 shows a schematic detailed partial view of two single coils arranged in layers in an imbricated manner with front-end and end portions of the wire, wherein one end portion of a single coil is cabled with a front-end portion of another single coil.

FIG. 7 shows a schematic view of two concentric single coils layered above each other in an imbricated manner, each with the front-end portions 5 and end portions 6 of the wire. It can be seen that the end portion of the single coil in this configuration comes to lie directly next to the front-end portion of an adjacent single coil. In this position the two portions can be cabled with each other, whereby the connecting leads 7 of the winding 1 are formed.

Figure 8A:
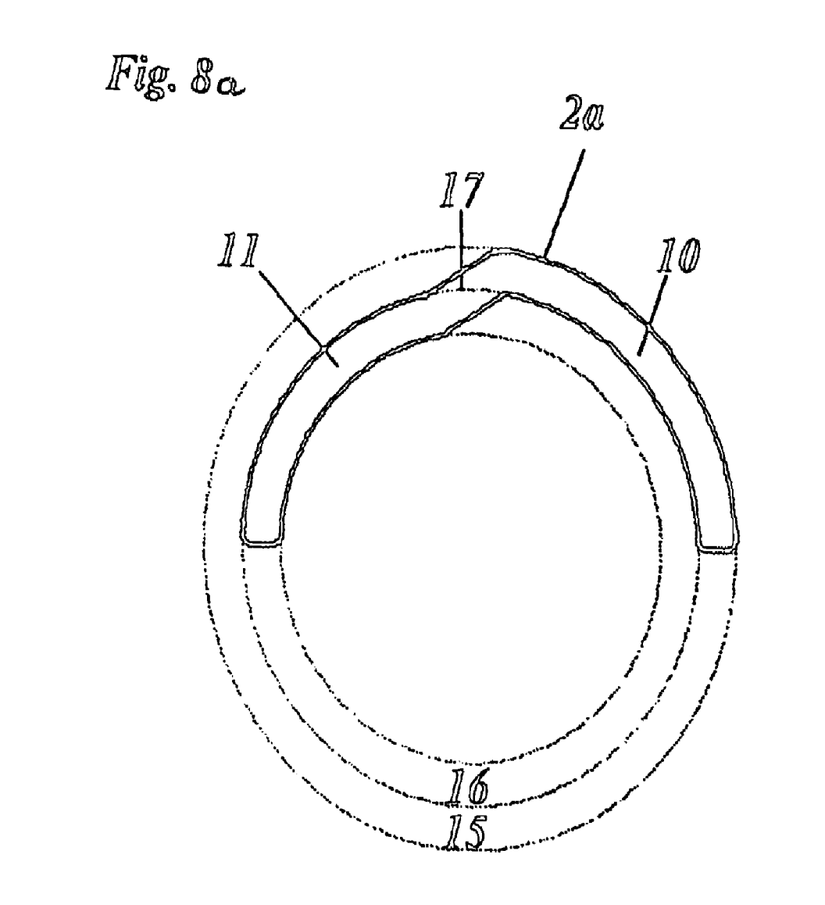
FIGS. 8a and 8b show an axial view of representations of the offset in two different embodiment examples.
Figure 8B:
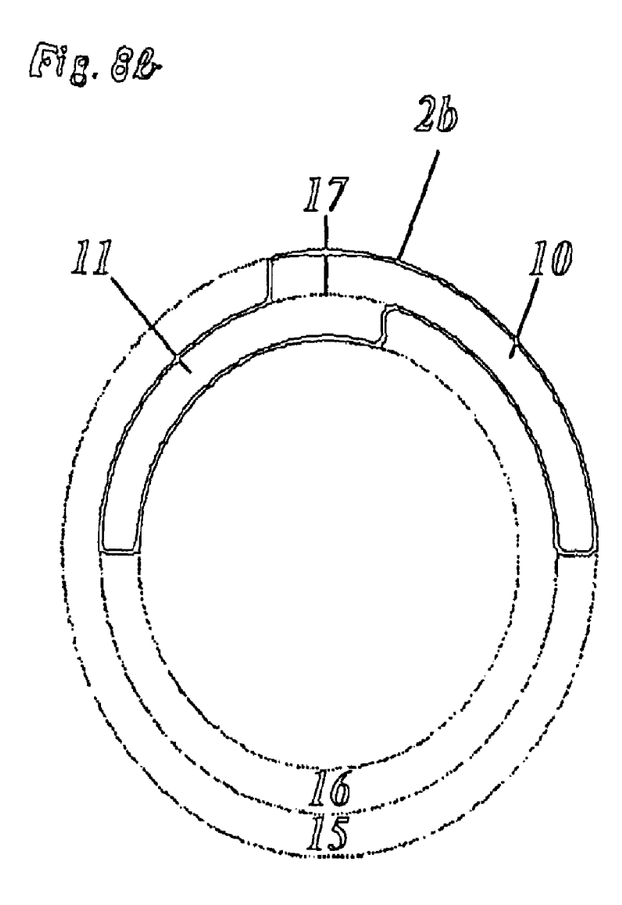

FIGS. 8*a* and 8*b* schematically show the axial view of the contour of a single coil in a concentric form 2*a* and of a single coil in a distributed form 2*b* in a cylindrical winding. Wires 4 and connecting leads 7 are not shown. It is well recognizable that one leg 10 extends in an outer cylinder 15 and one leg 11 extends in an inner cylinder 16, i.e. that a radial offset 17 is provided between these legs. The respective other legs are not visible in this perspective because they are located axially behind the front legs.

In exemplary embodiments, motors with windings having a high packing density can be produced, whereby a good degree of automation is realizable. The refuse is reduced, and the unbalance is decreased. By all this a technical advantage in line with lower costs is achievable.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. Electric motor comprising:
   an air-cored winding which is composed of a plurality of single coils made of wire, wherein the single coils overlap each other in an imbricated manner, wherein the single coils are preformed to form an offset at least in a region of two opposite corners; and
   the single coils having legs, wherein half of the legs are located in a first plane and half of the legs are located in a second plane, and wherein each single coil is, in an unwound form, arranged in a concentric spiral about an axis which extends in a direction perpendicular to a surface of the air-cored winding in a final winding form, so that in the final winding form, the wires of the single coils extend substantially tangentially, and the wires in a neutral zone are bent towards a radial direction thereby producing the offset between the first and second planes.

2. Electric motor according to claim 1, wherein the single coils form a winding in an imbricated overlapping manner, are bent about the axis of rotation of the motor and together form the shape of a hollow cylinder.

3. Electric motor according to claim 1, wherein the single coils are provided with additional wire material as feed in the region of the offset, which forms a hairpin-type or loop-shaped bulge at the inner contour of the single coil.

4. Electric motor according to claim 1, wherein both the inside and the outside of the single coil have a predefined shape.

5. Electric motor according to claim 1, wherein, the single coils are preformed to form an offset in a region of four corners, the wires changing planes radially at each corner.

6. Electric motor according to claim 1, wherein the single coil is formed asymmetrically and at least the single coil in the unwound flat state has a substantially quadrangular shape with unequally long legs and/or a kite-quadrangular shape.

7. Electric motor according to claim 1, wherein the single coils are provided with individual windings having between adjacent diagonal sections in the axial, central position a less inclined section extending parallel to the axis, said section forming a hexagon.

8. Electric motor according to claim 1, wherein a plurality of insulated single wires are cabled to form a strand prior to the winding process.

9. Electric motor according to claim 1, wherein each single coil comprises a front-end portion and an end portion of the single-layered or multilayered wire forming the single coil, with the front-end and end portions routed outwardly in the region of one of the corners of the single coil.

10. Electric motor according to claim 1, wherein one front-end portion of a first single coil is connected with an end portion of a second single coil to form a connecting lead.

11. Electric motor according to claim 1, wherein the winding is fabricated in single coils.

12. Electric motor according to claim 11, wherein a front-end portion of a wire layer of a first single coil is cabled with an end portion of an adjacent single coil, and the front-end portion of the wire of a first single coil is passed along on an outer side of a second single coil up to the end portion of the wire of the second single coil.

13. Electric Motor according to claim 11, wherein the wires each change planes at the lower and upper end by extending perpendicularly to the plane of projection.

14. Electric motor according to claim 11, wherein the legs located outside in the wound up coil are inclined more strongly than the legs located inside in the wound up coil.

15. Electric motor according to claim 2, wherein each single coil is, in an unwound form, arranged spirally about an axis which, in the wound up winding, extends in a radial direction, so that the wires in the neutral zone extend substantially tangentially.

16. Electric motor according to claim 15, wherein the single coils are provided with additional wire material as feed in a region of the offset, which forms a hairpin-type or loop-shaped bulge at an inner contour of the single coil.

17. Electric motor according to claim 16, wherein both the inside and the outside of the single coil have a predefined shape.

* * * * *

UNITED STATES PATENT AND TRADEMARK OFFICE
CERTIFICATE OF CORRECTION

PATENT NO. : 7,671,504 B2  Page 1 of 1
APPLICATION NO. : 11/584485
DATED : March 2, 2010
INVENTOR(S) : Richard Rohrer et al.

It is certified that error appears in the above-identified patent and that said Letters Patent is hereby corrected as shown below:

Title Page, Item (30) Foreign Application Priority Data, change "Oct. 25, 2005 (KR) 10 2005 051 059" to --Oct. 25, 2005 (DE) 10 2005 051 059--.

Signed and Sealed this

Twenty-eighth Day of September, 2010

David J. Kappos
*Director of the United States Patent and Trademark Office*